United States Patent [19]
Hagerty

[11] Patent Number: 6,042,051
[45] Date of Patent: Mar. 28, 2000

[54] EMERGENCY SELF INFLATING AIRCRAFT LANDING ASSIST SYSTEM

[75] Inventor: Jon C. Hagerty, Box 183/Rte. 110 N. (Main St.) "Red House", Chelsea, Vt. 05038

[73] Assignee: Jon C. Hagerty, Chelsea, Vt.

[21] Appl. No.: 08/966,900

[22] Filed: Nov. 10, 1997

Related U.S. Application Data

[60] Provisional application No. 60/032,028, Nov. 25, 1996.

[51] Int. Cl.⁷ ........................................................ B64C 3/56
[52] U.S. Cl. ........................ 244/49; 244/100 A; 244/107; 244/139
[58] Field of Search ................................ 244/139, 138 R, 244/146, 107, 218, 902, 49, 100 A

[56] References Cited

U.S. PATENT DOCUMENTS

| | | |
|---|---|---|
| 1,791,024 | 2/1931 | Eller .......................................... 244/107 |
| 2,161,722 | 6/1939 | Papp .......................................... 244/139 |
| 3,125,314 | 3/1964 | Smith . |
| 3,129,909 | 4/1964 | Smith . |
| 3,129,910 | 4/1964 | Smith . |
| 3,796,398 | 3/1974 | Eilertson ................................. 244/902 |
| 4,298,177 | 11/1981 | Berlongieri . |
| 4,382,567 | 5/1983 | Fredericks . |
| 4,480,807 | 11/1984 | Bowen . |
| 4,709,884 | 12/1987 | Gustafson ................................. 244/139 |
| 4,832,288 | 5/1989 | Kendall et al. ...................... 244/138 R |
| 4,923,145 | 5/1990 | Broadhurst . |
| 5,244,169 | 9/1993 | Brown et al. ............................ 244/146 |
| 5,259,574 | 11/1993 | Carrot ..................................... 244/107 |
| 5,356,097 | 10/1994 | Chalupa . |
| 5,560,568 | 10/1996 | Schmittle . |

FOREIGN PATENT DOCUMENTS 1405739  9/1975  United Kingdom ................... 244/218

*Primary Examiner*—Galen Barefoot

[57] ABSTRACT

An aircraft landing assist system comprised of a preformed and prepacked parawing-bag and fuselage housing and deployment is described. In case of emergency the system can be deployed automatically, manually, or by means of explosive charge. After deployment the open doors and the self inflated parawing-bag catch the on rushing air forcing the nose of the aircraft up. This helps increase the glide ratio and decrease the velocity of the aircraft. Control of the aircraft remains through the use of the upper wing surfaces and tail assembly. Upon landing the system helps extend the time of, and surface area of impact. Drains are provided in the aft section of the parawing-bag(s) to release rain or snow.

8 Claims, 2 Drawing Sheets

Figure 2
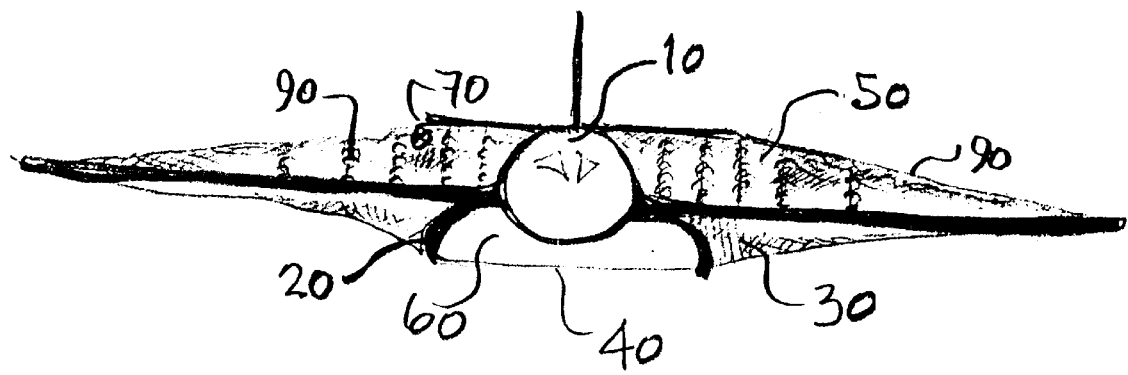
Figure 2A
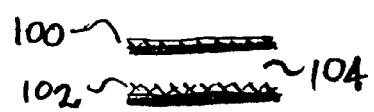
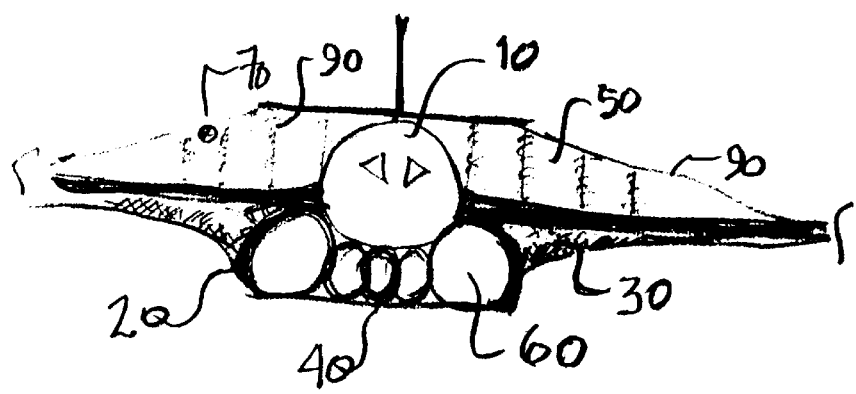
Figure 3

EMERGENCY SELF INFLATING AIRCRAFT LANDING ASSIST SYSTEM

This application claims the benefit of U.S. Provisional Application No. 60/032,028 filed Nov. 25, 1996.

FIELD OF THE INVENTION

This invention relates to emergency aircraft landing assist systems.

DESCRIPTION RELATIVE TO THE PRIOR ART

Ongoing advances in vehicular safety have improved conditions in the field. Yet, the airplane remains without any safety device to aid landing in an emergency. U.S. Pat. Nos. 3,125,314; 3,129,909 and 3,129,910 issued to R. D. Smith describe emergency parachutes and a system(s) to inflate an "air blanket" beneath the aircraft.

Berlongieri, U.S. Pat. No. 4,298,177 discloses parachute landing assist, with pontoons.

Fredericks et al., U.S. Pat. No. 4,382,567 discloses enclosures attached to the wings and fuselage, the enclosures having inflatable rubberized fabric bags contained therein.

Bowen, U.S. Pat. No. 4,480,807 discloses a mechanism to deploy parachutes in case of emergency.

Broadhurst, U.S. Pat. No. 4,923,145 discloses gas filled cushions to provide a landing blanket.

Chalupa, U.S. Pat. No. 5,356,097 discloses a separable capsule provided with a parachute.

Schmittle, U.S. Pat. No. 5,560,568 discloses a cushioning system for landing a specialized aircraft.

The present invention discloses a landing assist system that is simple to manufacture and operate and deploys beneath the aircraft forming a self inflating parawing-bag assembly.

SUMMARY OF THE INVENTION

The parawing-bag assist system is fabricated of 2 sheets of light weight durable material selected to bear the forces involved during operation with different types of aircraft.

The forward placed "Bomb Bay" doors or appended structure open(s) in case of emergency thus exposing the preformed and prepacked parawing-bag to the on rushing air. The force of the air ($F_R$) fills the parawing-bag and deploys it beneath the aircraft. $F_R$ is forward of the center of gravity (CG) of the aircraft thus helping to keep the nose of the aircraft up thus improving the glide ratio and reducing the velocity of the aircraft.

Upon landing the air filled parawing-bag assembly extends the time of and surface area of impact.

BRIEF DESCRIPTION OF THE DRAWINGS

The invention will be described with respect to the drawings, of which.

In the figures:
F=Force of Gravity.
FR=Force of Air Pressure Resistance.
CG=Center of Gravity.
10=Aircraft.
20=Bomb Bay Doors.
30=Self Inflating Parawing-Bag.
40=Self Inflating Parawing-Bag Support.
50=Preformed Bags of Parawing-Bag.
60=Air Inlets to System.
70=Drains In Parawing-Bag.
80=Appended Structure.
90=Welds to Form Bags of Parawing-Bag.
100=Top Sheet Fabric with Laminate—Airtight.
102=Bottom Sheet Fabric with Metallic Layers.
104=Air Trapped Between Sheets.

DESCRIPTION—MAIN EMBODIMENT

Figure 1:
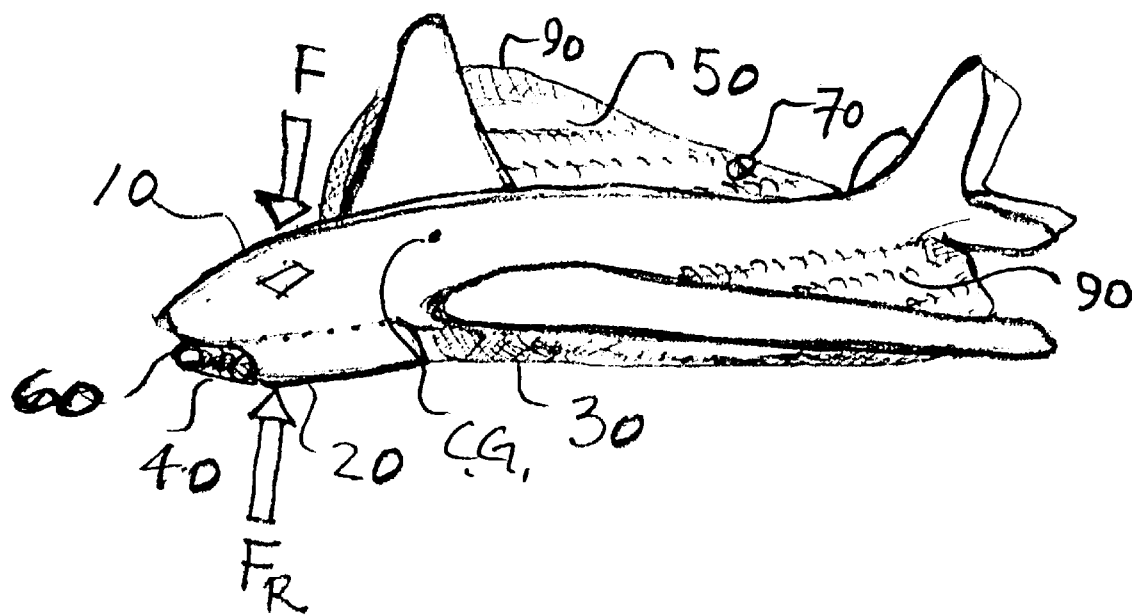
FIG. 1 is a drawing showing the deployed emergency self inflating aircraft landing assist system and/or appended structure.
Figure 1A:
FIG. 1a shows a drawing of the appended structure; before deployment.
Figure 1:
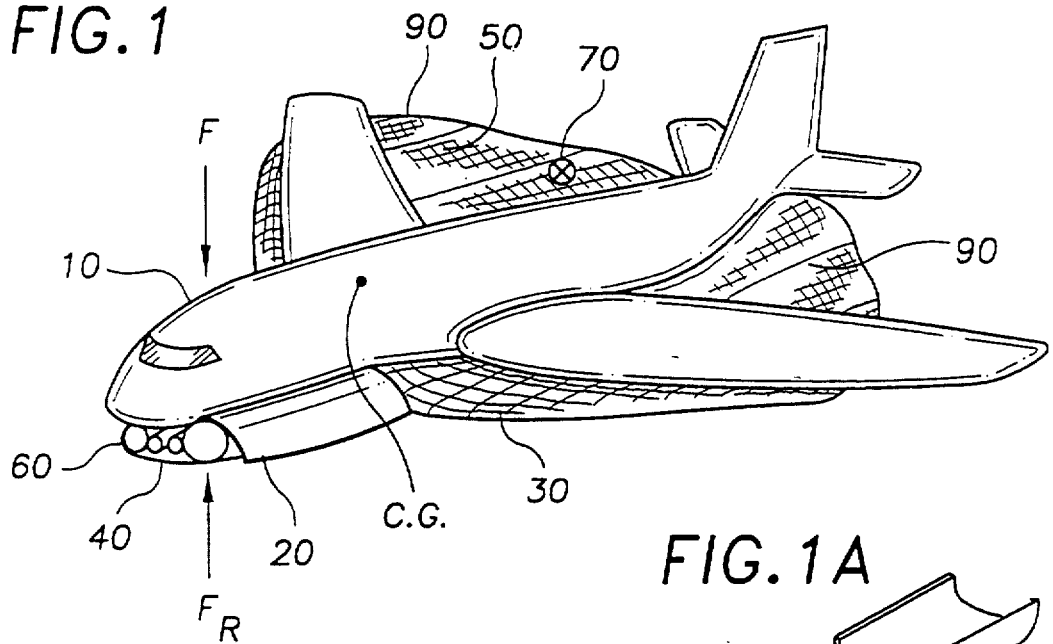
Figure 1A:

Referring to FIG. 1 and 1a, doors 20 or appended structure 80 located forward of the center of gravity CG of the aircraft 10 house the preformed parawing-bag 30 and constitute the basis of the invention.

Figure 2:
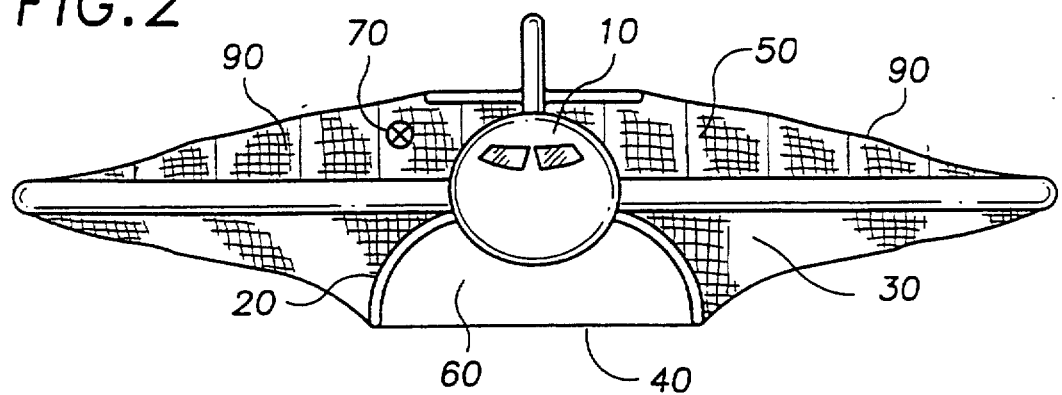
FIG. 2 is a front view drawing of the deployed system.

FIG. 2 shows a front view of the deployed system.

Figure 2A:
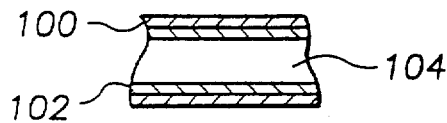
FIG. 2a shows a drawing of the parawing-bag in cross section with no welds.

FIG. 2a shows the top sheet of the parawing-bag 100, the bottom sheet of the parawing-bag 102 and entrapped air 104; from side view.

Figure 3:
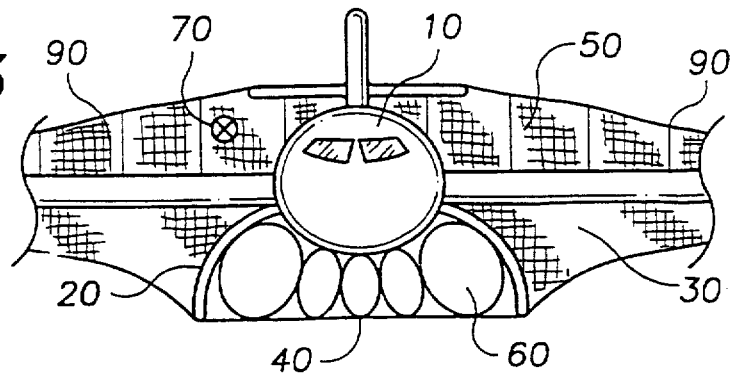
FIG. 3 is a front view drawing of the deployed system showing air inlets to parawing-bag system.

FIG. 3 shows the self inflating parawing-bag 30, air bags 50, air inlets 60, system support 40, drains 70 and welds 90; from front view.

In case of emergency the doors 20 and appended structure 80 open(s) automatically, manually, or by explosive charge to deploy the system 30. The deployed system acts as a resistant force FR forward of the center of Gravity CG of the aircraft 10 and against the force of gravity F. The FR lifts the nose of the aircraft thus increasing the glide ratio and decreasing the velocity of the aircraft.

Upon landing the self inflated parawing-bag 30 cushions the aircraft 10 and extends the time of, and surface area of impact.

A suitable material for fabricating the parawing-bag 30 may be radio frequency (RF) weldable fire resistant stainless steel reinforced Kevlar® (DuPont) which has been coated with an air impermeable layer 100 (polyurethane) and laminated with heat diffractive layers of metal foils or (vacuum) evaporated metals to retard heat transfer in case of fire; 100, 102.

Control of the aircraft 10 remains through the use of upper wing surfaces and the tail assembly. If power to the doors 20 or appended structure 80 is available control of the aircraft 10 could be achieved by closing to various degrees, one or the other door 20.

The above disclosed self inflating parawing-bag landing assist system is the more advanced and sophisticated embodiment of the invention. It will be appreciated that the preferred embodiment need not limit the scope of application with respect to the invention.

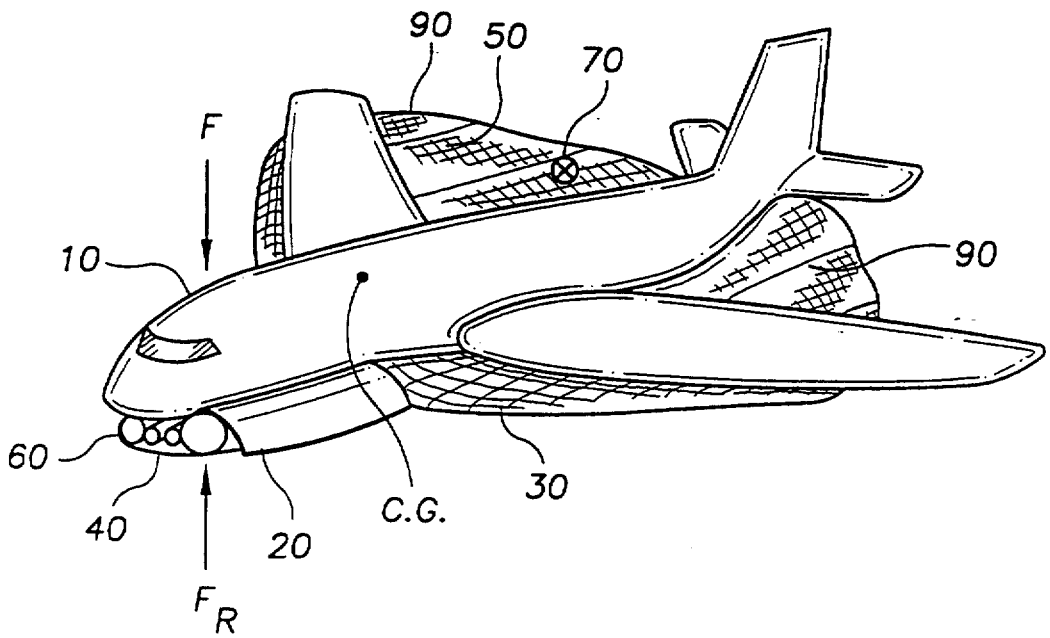

What is claimed is:

1. Apparatus for assisting the landing of an aircraft, said aircraft having a fuselage and main wings extending laterally from said fuselage, and said apparatus comprising:

A) a preformed parawing-bag made of two sheets of flexible material joined together;

B) means for stowing said parawing-bag in said aircraft;

C) means for inflating said parawing-bag comprising air inlets positioned adjacent and below the forward portion of the fuselage; and D) means for deploying said inflated parawing-bag beneath the wings and the fuselage, forming a large inflated surface area that extends between the wings and the fuselage and from adjacent the front of the fuselage to a position adjacent the rear of the fuselage, said deployed parawing-bag generates an additional lift force during flight and cushions the aircraft during landing.

2. The apparatus of claim 1 wherein said two sheets of flexible material are airtight seamable materials welded together to form said parawing-bag.

3. The apparatus of claim 1 wherein said parawing-bag is substantially impermeable to air loss.

4. The apparatus of claim 1 wherein said parawing-bag is stainless steel reinforced.

5. The apparatus of claim 1 wherein heat refractive material is laminated to said sheets of fabric.

6. The system of claim 1 wherein said means for stowing is provided in the fuselage of said aircraft.

7. The system of claim 1 wherein said means for stowing is provided with doors whereby said parawing-bag may be deployed.

8. The system of claim 1 wherein said means for stowing is an appended structure to said aircraft.

* * * * *

UNITED STATES PATENT AND TRADEMARK OFFICE
CERTIFICATE OF CORRECTION

PATENT NO. : 6,042,051
DATED : March 28, 2000
INVENTOR(S) : Hagerty

It is certified that error appears in the above-identified patent and that said Letters Patent is hereby corrected as shown below:

The title page, showing an illustrative figure, should be deleted and substitute therefor the attached title page.

Delete Drawing Sheets 1-2, and substitute therefor the Drawings sheet, consisting of FIGS. 3, as shown on the attached pages.

Signed and Sealed this

Twenty-seventh Day of February, 2001

Attest:

NICHOLAS P. GODICI

Attesting Officer  Acting Director of the United States Patent and Trademark Office

United States Patent [19]
Hagerty

[11] Patent Number: 6,042,051
[45] Date of Patent: Mar. 28, 2000

[54] EMERGENCY SELF INFLATING AIRCRAFT LANDING ASSIST SYSTEM

[75] Inventor: Jon C. Hagerty, Box 183/Rte. 110 N. (Main St.) "Red House", Chelsea, Vt. 05038

[73] Assignee: Jon C. Hagerty, Chelsea, Vt.

[21] Appl. No.: 08/966,900

[22] Filed: Nov. 10, 1997

Related U.S. Application Data

[60] Provisional application No. 60/032,028, Nov. 25, 1996.

[51] Int. Cl.$^7$ ................................. B64C 3/56
[52] U.S. Cl. .................. 244/49; 244/100 A; 244/107; 244/139
[58] Field of Search ............... 244/139, 138 R, 244/146, 107, 218, 902, 49, 100 A

[56] References Cited

U.S. PATENT DOCUMENTS

| 1,791,024 | 2/1931 | Eller ........................... 244/107 |
| 2,161,722 | 6/1939 | Papp ........................... 244/139 |
| 3,125,314 | 3/1964 | Smith . |
| 3,129,909 | 4/1964 | Smith . |
| 3,129,910 | 4/1964 | Smith . |
| 3,796,398 | 3/1974 | Eilertson ..................... 244/902 |
| 4,298,177 | 11/1981 | Berlongieri . |
| 4,382,567 | 5/1983 | Fredericks . |
| 4,480,807 | 11/1984 | Bowen . |
| 4,709,884 | 12/1987 | Gustafson ................... 244/139 |
| 4,832,288 | 5/1989 | Kendall et al. ............. 244/138 R |
| 4,923,145 | 5/1990 | Broadhurst . |
| 5,244,169 | 9/1993 | Brown et al. ............... 244/146 |
| 5,259,574 | 11/1993 | Carrot ......................... 244/107 |
| 5,356,097 | 10/1994 | Chalupa . |
| 5,560,568 | 10/1996 | Schmittle . |

FOREIGN PATENT DOCUMENTS

| 1405739 | 9/1975 | United Kingdom ............ 244/218 |

*Primary Examiner*—Galen Barefoot

[57] ABSTRACT

An aircraft landing assist system comprised of a preformed and prepacked parawing-bag and fuselage housing and deployment is described. In case of emergency the system can be deployed automatically, manually, or by means of explosive charge. After deployment the open doors and the self inflated parawing-bag catch the on rushing air forcing the nose of the aircraft up. This helps increase the glide ratio and decrease the velocity of the aircraft. Control of the aircraft remains through the use of the upper wing surfaces and tail assembly. Upon landing the system helps extend the time of, and surface area of impact. Drains are provided in the aft section of the parawing-bag(s) to release rain or snow.

8 Claims, 2 Drawing Sheets